June 11, 1968 SADAJI ANDO 3,387,350
HINGE AND METHOD OF MAKING THE SAME
Filed Oct. 22, 1965 4 Sheets-Sheet 1

INVENTOR
SADAJI ANDO
By: Steinberg & Blake
atty.

June 11, 1968     SADAJI ANDO     3,387,350

HINGE AND METHOD OF MAKING THE SAME

Filed Oct. 22, 1965     4 Sheets-Sheet 2

INVENTOR
SADAJI ANDO

INVENTOR.
SADAJI ANDO
BY Steinberg & Blake
Atty

June 11, 1968 SADAJI ANDO 3,387,350
HINGE AND METHOD OF MAKING THE SAME
Filed Oct. 22, 1965 4 Sheets-Sheet 4

INVENTOR.
SADAJI ANDO
BY Steinberg & Blake
Atty

United States Patent Office 3,387,350
Patented June 11, 1968

3,387,350
HINGE AND METHOD OF MAKING THE SAME
Sadaji Ando, Osaka, Japan, assignor to Nippon Hatsujo Kabushiki Kaisha, Yokohama, Japan
Filed Oct. 22, 1965, Ser. No. 501,812
Claims priority, application Japan, Dec. 31, 1964, 40/96; Feb. 1, 1965, 40/5,718
9 Claims. (Cl. 29—11)

ABSTRACT OF THE DISCLOSURE

A hinge composed of a pair of winged bearing members and a pin. Each wing bearing member is composed of a wing and a round bar extending longitudinally along one edge of the wing and merging integrally and smoothly into the wing which extends laterally from the round bar. The round bars are bored to receive the hinge pin. The metal which constitutes the winged bearing members of the hinge is characterized by a substantially homogeneous grain structure and a substantially uniform distribution of stresses. These latter results are achieved at least in part by rolling the metal which is used for the hinge from a primary intermediate product into a secondary intermediate product while twisting the metal so as to apply to the secondary intermediate product compressive forces which act with respect to the secondary intermediate product in a direction differently from the compressive forces which act with respect to the primary intermediate product, and then this second intermediate product is rolled into a tertiary intermediate product with a further change in the direction of compressive forces acting with respect to the tertiary intermediate product, as compared to the direction of the compressive forces acting with respect to the secondary intermediate product.

---

This invention relates to improvements in a hinge, a method of making the same, and an apparatus for carrying out the method.

Heretofore, the hinge has been made by the method of any of casting, forging, extruding, drawing, plate-bending, etc. However, these methods are not satisfactory. The casting requires the mold and sufficient efficiency is not obtained. The forging requires a great many operations obtaining inaccurate products. The drawing and the extruding are limited within the working of soft materials, for example, brass so that satisfactorily strong product is not obtained. The product in accordance with the plate-bending is not sufficiently accurate and easily deformable.

One object of this invention is to provide a hinge which is sufficiently accurate and strong and may be satisfactorily operated for a very considerable length of time and not be easily deformable.

Another, and more specific, object of this invention is to provide a hinge having a large overhanging capacity and a high abrasion hardness.

Still another object of this invention is to provide a method of making such meritorious hinges as above, which is sufficiently simple and accommodated for the mass-production of such a desirable product.

Briefly stated in accordance with one aspect of this invention, there is provided a hinge, of which the winged bearing member is specifically rolled so as to have a homogeneous structure, distribution of stress, and excellent abrasion hardness, and there are provided a method of making such an excellent hinge and an apparatus for carrying out the method. The method comprises steps of rolling a material of steel into a primary intermediate product composed of a round bar and a flat wing integral therewith and having a cross section composed of a circle having integrally therewith a roundedly, radially extended rectangular protrusion by means of at least a primary rolling mill having corresponding grooves arranging the long edge of the rectangle in parallel with the nip of the primary rolling mill, rolling the primary intermediate product into a secondary intermediate product composed of a round bar and a flatter wing integral therewith and having a cross section composed of a circle having integrally therewith a roundedly, radial-like tangentially more extended rectangular protrusion by means of at least a secondary rolling mill having corresponding grooves arranging the long edge of the rectangle at the right angle to the nip of the secondary rolling mill within a plane including the axes of the secondary rolling mill, rolling the secondary intermediate product into a tertiary intermediate product composed of a round bar and a more flatter wing integral therewith and having a cross section composed of a circle having integrally therewith a roundedly, tangentially more and more extended rectangular protrusion by means of at least a tertiary rolling mill having corresponding grooves arranging the long edge of the rectangle at an angle to the nip of the tertiary rolling mill within a plane including the axes of the tertiary rolling mill, cutting the tertiary intermediate product into desired cut length members, forming an axial round bore in and through the round bar concentrically therewith, inserting a corresponding round pin into the bores of at least two of the cut length members so as to assemble a hinge, and providing a number of screw holes in and through the flat wings.

It is preferred that a stainless steel is used as the material to be worked in accordance with this invention. Preferable stainless steel includes that containing 18 percent of Cr, 8 percent of Ni, and 74 percent of Fe. In accordance with this invention, a bloom or a billet of such stainless steel is hot rolled gradually so as to subject gradual plastic deformation to the raw material as a continuous operation. By virtue of such a manner of operation as above, the method is particularly accommodated to the mass-production. In order to provide a large overhanging capacity and an excellent abrasion hardness which are required in view of the substance of the hinge, the raw material for the winged bearing member in accordance with this invention is worked in various directions during the rolling operation so as to homogenize the grain structure and the distribution of stress. It is also preferred to subject the tertiary intermediate product to a heat treatment after rolled in order to improve the distribution of stress and hardness.

If the material is unsystematically rolled, an intermittent banded crack-like structure arranged in the rolling direction of the winged bearing member would occur which is not removable by grinding. In order to overcome such a defect, it is necessary to determine a dimension in the cross section of the secondary intermediate product shorter than that of the primary intermediate product and to work in such a manner as to obtain such a result by means of the rolling mills so adapted. In addition, it is intended that flow of the material near the end parts is reduced by means of selecting the specified contours in the axial sections of the rolls whereby advantageous contours in the radial section of the produced winged bearing member and specially strong bearing portion of the member are obtained.

The invention will be better understood and other objects and additional advantages of the invention will become apparent upon perusal of the following description taken in connection with the drawings, in which:

FIGS. 1, 2, 3, and 4 are cross sectional views of raw materials of blooms or billets;

Referring more particularly to the drawings, the preferred embodiments of this invention will now be described; however, this description will be understood to be illustrative of the invention and not as limiting it to the particular constructions and procedures shown and described.

*Example I*

Figure 1:
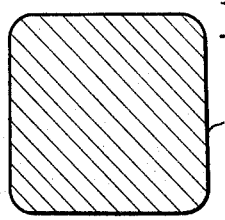
Figure 2:
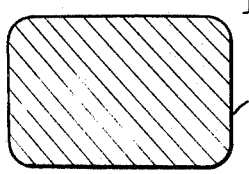
Figure 3:
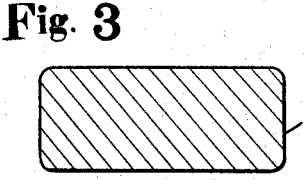
Figure 4:
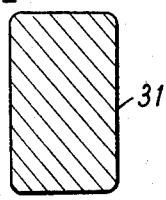
Figure 5:
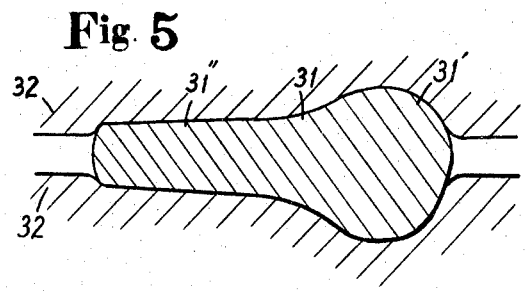

A stainless steel bloom having a cross sectional shape 31 as shown in FIG. 1, of which composition was 18% Cr, 8% Ni, and balance Fe, was worked by a continuous mill for the production of a winged bearing member of a hinge. Other cross sectional shapes of blooms or billets to be used as the material are shown in FIGS. 2, 3, and 4. The continuous mill comprises at least a primary rolling mill, a secondary rolling mill, and at least a tertiary rolling mill, arranged in tandem. The pass 32 of the primary two-high rolling mill and the cross sectional shape of the primary intermediate product finished there are shown in FIG. 5. As shown the right-handed end of the cross sectional shape of the primary intermediate product 31 is a circle 31'. A rectangle 31" is extended therefrom radially leftwards. The base of the rectangle 31" is roundedly continued to the circle 31'. The size of the circle 31' and the vertical size of the rectangle 31" are appreciably larger than the cross section of the bearing portion of and the thickness of the wing portion of the finished winged bearing members, respectively, while the horizontal size of the rectangle 31" is appreciably shorter than the radial length of the wing portion. These differences in size are systematically selected and gradually diminished in the process of the rolling, as referred to hereinafter. The center of the cross sectional shape of the primary intermediate product is arranged in the nip. In other words, the two rolls are grooved symmetrically correspondingly to the shape of the primary intermediate product 31.

Figure 6:
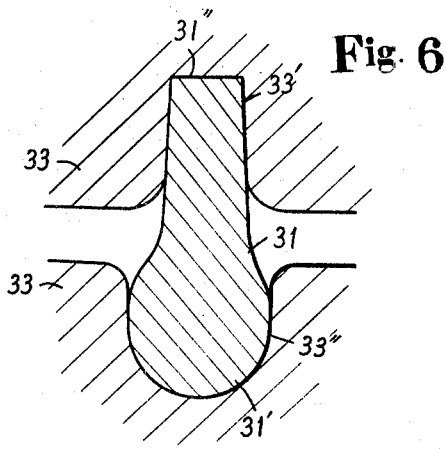
FIGS. 5 through 10 are cross sectional views of a successively semi-worked winged bearing member shown with axial sections of rolling mills partly removed, respectively, embodying the principles of this invention.

The primary intermediate product 31 is then worked by at least a secondary two-high rolling mill 33. The intermediate product 31 produced by the primary rolling mill 32 is twisted by a quarter of a turn during being directed to the secondary mill 33 so that the rightmost half of the circle 31' in the cross section is twisted down so as to be arranged in a shallow wide groove 33" formed in the lower roll of the secondary rolling mill 33, while the rectangular portion 31" is twisted up so as to be arranged in a deep narrow groove 33' formed in the upper roll of the secondary mill 33. Although the grooves formed in the lower roll and the upper roll are symmetrical in the primary rolling mill 32, those formed in the rolls of the secondary rolling mill are not symmetrical. In addition, the vertical central lines thereof are out of alignment with each other. As shown in FIG. 6, the vertical central line of the upper groove 33' is somewhat shifted rightwards from the vertical central line of the lower groove 33" so that the secondary intermediate product 31 is made to have a more nearly straight right side and a more bended left side in section.

Figure 7:
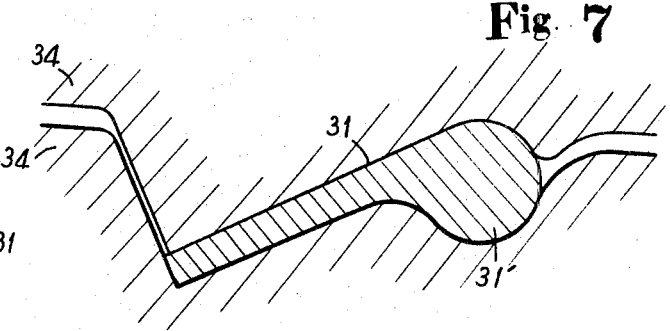
Figure 8:
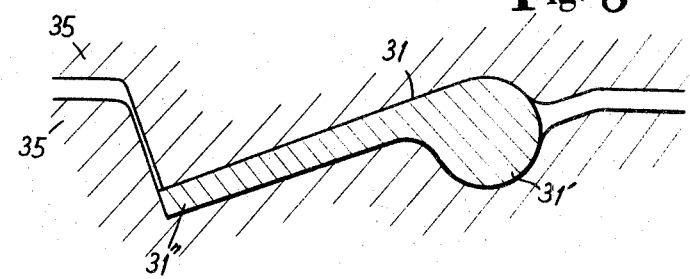
Figure 9:
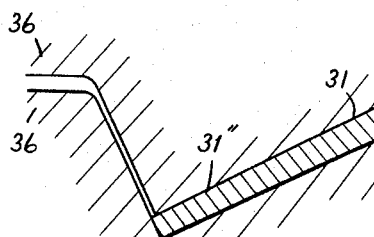
Figure 10:
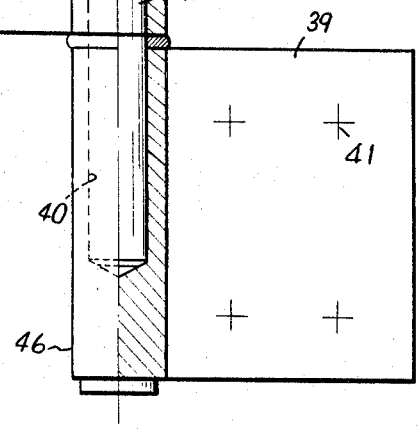
Figure 10:
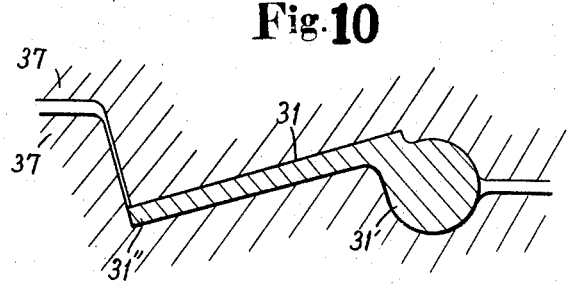

The secondary intermediate product 31 is then worked by, for example, four tertiary two-high rolling mills 34, 35, 36, and 37. The upper rolls of these mills are provided with a low rounded circumferential rib and a high angular circumferential rib and a circumferential groove therebetween. The lower rolls of these mills are provided with a shallow rounded circumferential groove and a deep angular circumferential groove and a circumferential rib therebetween. Between these pairs of rolls the secondary intermediate product is worked into the tertiary intermediate product, of which the cross section taken at the right angle to the rolling direction is composed of a circle and a long rectangle integral therewith. A short edge of the rectangle is dissolved into the circle 31' being arranged tangentially with a rounded contour at first as shown in FIGS. 7, 8, and 9, but at last one right angle of the rectangle 31" is arranged out of the round edge of the circle 31' clearly as shown in FIG. 10. In other words, the tangent along which the rectangle 31" is extended is made to lie gradually remoter from the circle 31'. The circle 31' is rolled by the inside surface of the low rib of the upper roll and shallow groove of the lower roll. The rectangle 31" is rolled by the inside surface of the high rib of the upper roll and the inside surface of the deep groove of the lower roll. Strictly speaking, the rectangle 31" is not a true one but an extreme trapezoid: The winged bearing member to be produced has the wing in which the remoter portion from the round bar is thinner in cross section.

As shown in FIGS. 7 through 10, the long edges of the rectangle 31" of the cross section of the wing are arranged at an angle to the axes of the rolls. If the long edges are arranged in parallel to the axes, there would occur a camber-like phenomenon due to the uneven distribution of pressure. By virtue of the inclined arrangement of the rectangle, such a phenomenon is prevented and also the release from the rolls is facilitated.

When the mill length approaches 20 meters during the above operations, the intermediate product is cut into 5 meters. The tertiary intermediate product is subjected to a heat treatment. That is, it is waterquenched from a temperature of 1000 to 1200° C. whereby the distribution of stress is improved.

Figure 19:
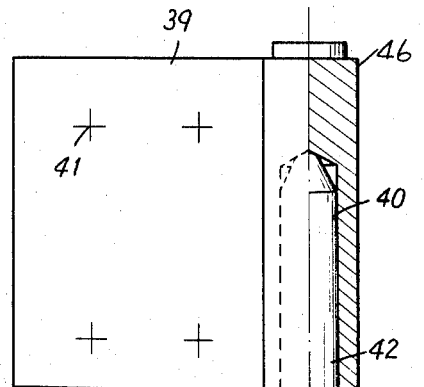
FIG. 19 is a front view of a hinge embodying the principles of this invention.
Figure 21:
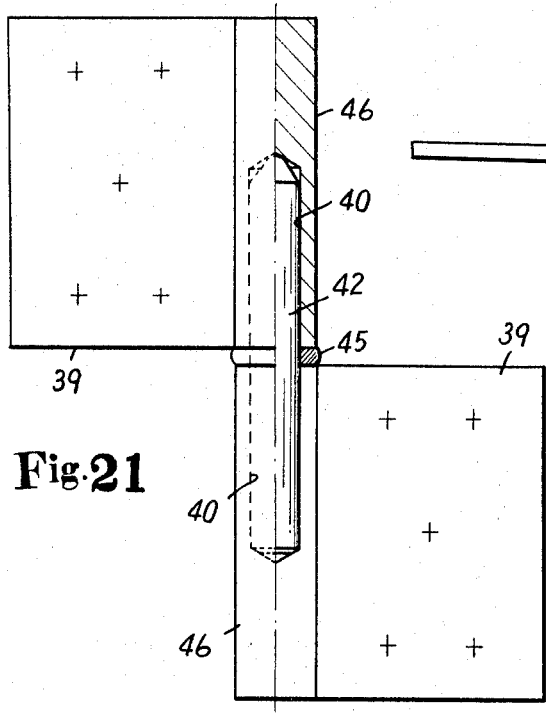
FIG. 21 is a front view of another hinge embodying the principles of this invention.
Figure 23:
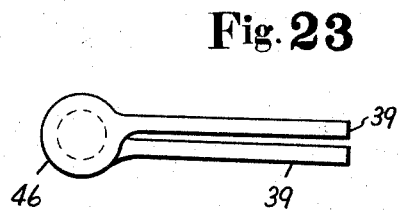
FIG. 23 is a top plan view thereof in the folded position.

The last rolling mill shown in FIG. 10 is provided for finishing, obtaining a longitudinally continuous member, which has a predetermined precise dimension in every direction other than the axial length. Then such a longitudinally continuous member is cut into desired cut length members in a conventional manner. Then an axial round bore is formed in and through the round bar concentrically therewith in a conventional manner, so as to complete a winged bearing member. Sometimes, the bore is formed as a blind one 40 as shown in FIGS. 19 and 21. It will be seen that such blind bores 40 in a pair of the winged bearing member should be formed oppositely.

A pin 42 finished precisely in a conventional manner is inserted through a washer 45 and into the blind bores 40 of a pair of the winged bearing members so as to finish a hinge. In general, a number of screw holes 41 are formed in and through the wings 39.

*Example II*

Figure 11:
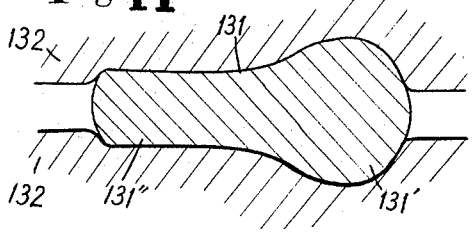
FIGS. 11 through 18 are cross sectional views of another successsively semi-worked winged bearing member shown with axial sections of rolling mills partly removed, respectively, also embodying the principles of this invention.
Figure 12:
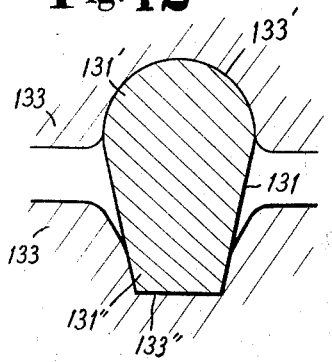

A primary intermediate product 131 rolled by a primary two-high rolling mill 132 similarly to the preceding embodiment as shown in FIG. 11 is edged also in this embodiment in the opposite direction to the preceding embodiment as shown in FIG. 12. That is to say, a shallow wide groove 133' is provided in the upper roll and the deep narrow groove 133″ is provided in the lower roll.

Figure 13:
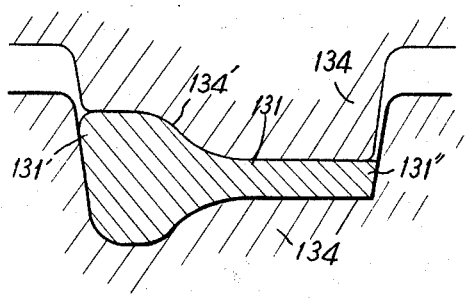

The secondary intermediate product 131 is directed to a tertiary rolling mill 134 composed of an upper roll having a rib and a shoulder 134′ thereof and a lower roll having a deep groove, being further edged between the secondary rolling mill 133 and the tertiary rolling mill 134. The rib of the upper roll having a rather straight edge in section is continued to the shoulder with an inclined line roundedly. The deep groove of the lower roll is continued to a shallower straight line roundedly. The straight edge of the upper roll faces the straight line of the lower roll so as to insert the unfinished wing portion 131″ therebetween. The shoulder of the upper roll faces the deep groove of the lower roll so as to insert the unfinished round bar portion 131′ therebetween. The cross section of this nip is specified by the upper left corner as shown in FIG. 13 where a rather angular, acute contour is provided.

The tertiary intermediate product 131 is directed to a quaternary rolling mill 135 having a nearly mirrored contour in cross section from the tertiary rolling mill 134. Between the tertiary rolling mill 134 and the quaternary rolling mill 135, the tertiary intermediate product 131 is twisted by half a turn or upset whereby the structure is more homogenized.

Figure 20:
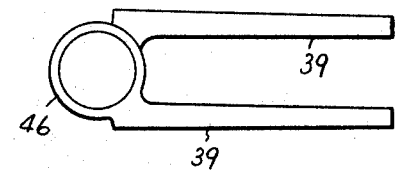
FIG. 20 is a top plan view thereof in an opened position.
Figure 15:
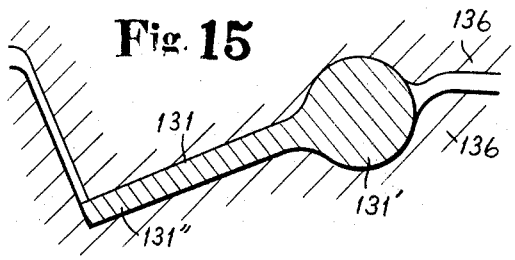
Figure 16:
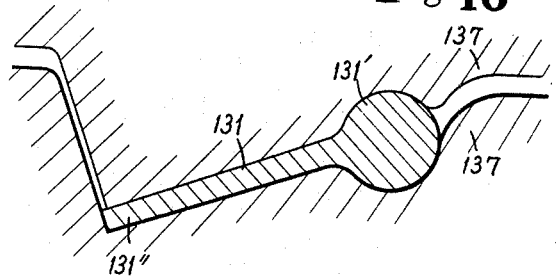
Figure 17:
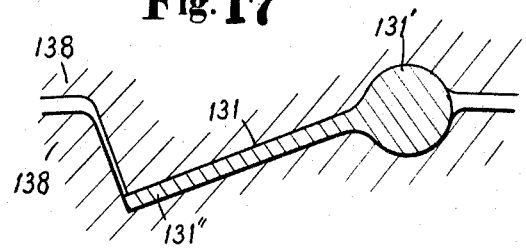
Figure 18:
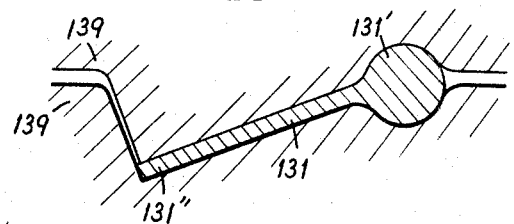
Figure 14:
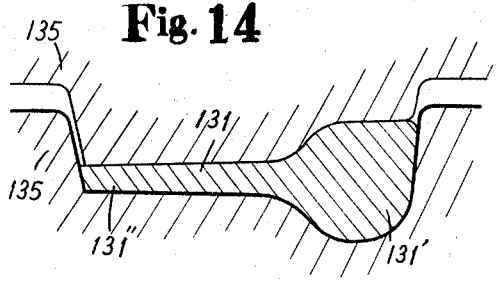
Figure 22:
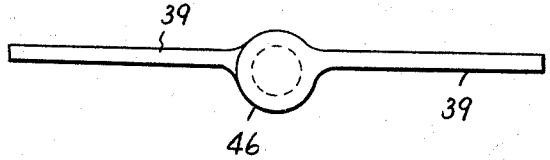
FIG. 22 is a top plan view thereof in an opened position.

Then the quaternary intermediate product 131 is directed to three sub-finishing rolling mills arranged in tandem as shown in FIGS. 15, 16 and 17. They are similar to the tertiary rolling mills of the preceding embodiment. However, the tangent being in parallel with the long edge of the rectangle representing the wing portion of the winged bearing member is not positioned so remote from the center of the circle representing the round bar of the member so that there is not such a right angle of the rectangle 131″ arranged out of the round edge of the circle 131′ in cross section of the winged bearing members finished by the finishing rolling mill 139 as in the preceding embodiment. The former contour is shown in FIGS. 22, 23, 25, and 26, while the latter contour is shown in FIG. 20.

The longitudinally continuous member finished by the finishing rolling mill 139 is cut into desired cut length members, of which the round bar portion 46 is then bored similarly to the preceding embodiment. Two of such bored cut length members and a washer 45 is assembled with a pin 42 into a hinge similarly to the preceding embodiment.

Example III

Figure 24:
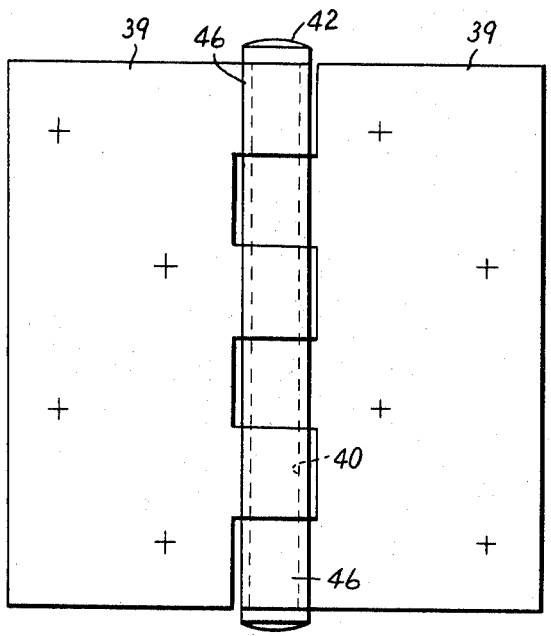
FIG. 24 is a front view of still another hinge embodying the principles of this invention.
Figure 26:
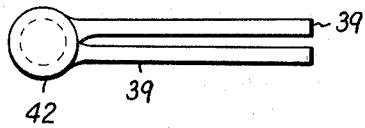
FIG. 26 is a top plan view thereof in the folded position.
Figure 25:
FIG. 25 is a top plan view thereof in an opened position.

Two cut length members made as in the preceding embodiment are bored so as to have through bores, respectively. The bored round bar portion 46 of each winged bearing member is divided into axially arranged six parts having axially equal length one after another. Alternate three parts of these six parts are cut about, so that the one member becomes to be adapted to engage with the other when the one member is inverted within the plane of the wing 39. Such two winged bearing members are assembled into a hinge with a pin 42 having a head in one end. The other end is peened with a cap, obtaining a hinge as shown in FIGS. 24, 25, and 26.

Example IV

Figure 27:
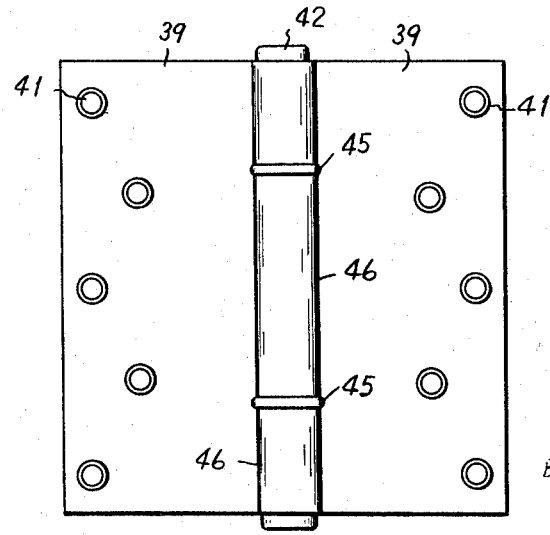
FIG. 27 is a front view of further another hinge embodying the principles of this invention.

In this embodiment, a hinge is made as the preceding embodiment. However, the bored round bar portions 46 are cut about in another manner. The bored round bar portion of a winged bearing member is cut about at the both ends and that of the other winged bearing member is cut about at the center. The both ends extend about a quarter of the overall axial length and the center extends about a half thereof. Two washers 45 are inserted between the end part and the center part so as to assemble a hinge having a precise axial length in whole. The hinge made in this embodiment is illustrated in FIG. 27.

Example V

Some samples of hinges made in Example I were tested by means of an actual use in the following manner comparing with other hinges.

The samples of hinges were secured to posts and doors, respectively. Each was secured at an upper position and a lower position of the door weighed 48.5 kg. An operation consisting of an opening and a closing along an angle of 110° was repeated 45,000 times. After the operation, reductions in dimensions were measured as indications of abrasion. The samples made in the Example I were provided with pins of chrome-molybdenum steel. The samples compared were made of stainless steel by plate-bending method and of brass by extrusion. The former was provided with a pin of the same material and the latter was of usual steel.

TABLE 1
[Abrasion in length, mm.]

| | Sample | | | | | |
|---|---|---|---|---|---|---|
| | Stainless Rolled made in Example I | | Stainless plate-bended | | Brass extruded | |
| Position | Upper | Lower | Upper | Lower | Upper | Lower |
| Overall vertical length | 0.07 | 0.05 | 0.13 | 0.07 | 0.20 | 0.23 |
| Diameter of pin | 0.01 | 0.01 | 0.01 | 0.01 | 0.05 | 0.06 |
| Diameter of bore | 0.01 | 0.01 | 0.06 | 0.04 | 0.42 | 0.39 |

The samples were measured by Vickers hardness.

TABLE 2
[Vickers hardness, load 20 kg. (average from two samples)]

| | Sample | | | |
|---|---|---|---|---|
| | Stainless Rolled made in Example I | Stainless plate-bended | Brass extruded | Iron forged |
| Wing thickness: | | | | |
| 3 mm | 163.9 | 194.5 | | |
| 4 mm | 160.1 | 181.5 | | 180 |
| 4.5 mm | | | 139 | |

The mechanical properties of the samples measured were as follows:

TABLE 3.—MECHANICAL PROPERTIES

| | Sample | | | | | |
|---|---|---|---|---|---|---|
| | Stainless Rolled made in Example I | | Brass extruded | | Iron forged | |
| Tensile strength: | | | | | | |
| Load: | | | | | | |
| Kg | 8,850 | 8,950 | 5,500 | 5,600 | 9,050 | 9,150 |
| Kg./mm.² | 63 | 63 | 39 | 40 | 64 | 65 |
| Elongation (guage length, 50 mm.): | | | | | | |
| Actual length, mm | 81.6 | 81.0 | 58.9 | 58.5 | 57.5 | 57.1 |
| Percent | 63 | 62 | 18 | 17 | 15 | 14 |

While particular embodiments of the invention have been illustrated and described, modifications thereof will readily occur to those skilled in the art. It should be understood therefore that the invention is not limited to the particular procedures and arrangements disclosed but that the appended claims are intended to cover all modifications which do not depart from the true spirit and scope of the invention.

What is claimed as new and desired to be secured by Letters Patent of the United States is:

1. A method of making a hinge, comprising steps of rolling steel into a primary intermediate product composed of a round bar and a flat wing integral therewith and having a cross section composed of a circle having integral and smoothly merging therewith a radially extended rectangular protrusion, while applying to the steel during rolling thereof compressive forces which extend in a given direction with respect to the primary intermediate product, rolling said primary intermediate product into a secondary intermediate product composed of a round bar and a flat wing integral therewith and having a cross section composed of a circle having integral therewith a radial substantially rectangular protrusion, while applying to said secondary intermediate product during the rolling thereof compressive forces which act with respect to said secondary product in a direction perpendicular to the direction of application of compressive forces with respect to said primary intermediate product, rolling said secondary intermediate product into a tertiary intermediate product composed of a round bar and a flatter wing integral therewith and having a cross section composed of a circle having integral therewith a more extended rectangular protrusion, while applying to said tertiary intermediate product during the rolling thereof compressive forces which act with respect to said tertiary product in a direction different from the direction in which the compressive forces applied to said secondary intermediate product act with respect thereto, cutting said tertiary intermediate product transversely into desired cut length members, forming an axial round bore in said round bar concentrically therewith, and inserting a corresponding round pin into the thus formed bores of at least two of said cut length members so as to assemble a hinge.

2. A method of making a hinge, as claimed in claim 1, further comprising a step of providing a continuous transition from the rolling of said primary intermediate product to the rolling of said secondary intermediate product while twisting said primary intermediate product during said transition.

3. A method of making a hinge, as claimed in claim 1, further comprising a step of providing a continuous transition from the rolling of said secondary intermediate product to the rolling of said tertiary intermediate product while twisting said secondary intermediate product during said transition.

4. A method of making a hinge, as claimed in claim 1, further comprising a step of twisting said tertiary intermediate product twice during rolling thereof.

5. A method of making a hinge, as claimed in claim 1, in which the diameter of said circle and the length of the short edge of said rectangle are gradually diminished while the length of the long edge of said rectangle is gradually elongated during said rolling operations.

6. A method of making a hinge, as claimed in claim 1, in which said rectangle is gradually deformed into a trapezoid during said rolling operations providing said flat wing with a thickness which gradually diminishes from said round bar to an outer edge of said wing remote from and substantially parallel to said round bar.

7. A method of making a hinge, as claimed in claim 1, further comprising a step of subjecting said tertiary intermediate product to a heat treatment.

8. A method of making a hinge, as claimed in claim 1, further comprising a step of cutting away at least a part of said round bar along a radial cut end and the border between said round bar and said wing.

9. A method of making a hinge, as claimed in claim 1, further comprising a step of providing a number of screw holes in and through said flat wing.

References Cited

UNITED STATES PATENTS 1,906,648   5/1933   Soss _____ 29—11

RICHARD H. EANES, Jr., *Primary Examiner.*